US010122674B2

(12) United States Patent
Keszler et al.

(10) Patent No.: US 10,122,674 B2
(45) Date of Patent: Nov. 6, 2018

(54) METHOD OF CREATING A PXLGRAM

(71) Applicants: Stephan Keszler, Southampton, NY (US); Brendan Manley, Southampton, NY (US)

(72) Inventors: Stephan Keszler, Southampton, NY (US); Brendan Manley, Southampton, NY (US)

(73) Assignee: IPXLU, LLC, Southampton, NY (US)

( * ) Notice: Subject to any disclaimer, the term of this patent is extended or adjusted under 35 U.S.C. 154(b) by 0 days.

(21) Appl. No.: 15/330,032

(22) Filed: Jul. 28, 2016

(65) Prior Publication Data

US 2018/0034765 A1 Feb. 1, 2018
US 2018/0212915 A9 Jul. 26, 2018

Related U.S. Application Data

(60) Provisional application No. 62/285,643, filed on Nov. 3, 2015, provisional application No. 62/387,059, filed on Dec. 21, 2015.

(51) Int. Cl.
*G06K 9/62* (2006.01)
*H04L 12/58* (2006.01)
*H04L 29/08* (2006.01)

(52) U.S. Cl.
CPC ............ *H04L 51/32* (2013.01); *G06K 9/6218* (2013.01); *H04L 67/02* (2013.01)

(58) Field of Classification Search
CPC ........... G06F 17/3089; G06F 17/30864; G06F 3/0481; G06F 17/30011
USPC ............... 382/225, 227, 282, 284, 294, 307; 715/205, 207, 208
See application file for complete search history.

(56) References Cited

U.S. PATENT DOCUMENTS

| | | | | |
|---|---|---|---|---|
| 6,640,145 B2* | 10/2003 | Hoffberg | ............ | G05B 19/0426 700/17 |
| 7,181,681 B2* | 2/2007 | Kundu | ................ | G06F 17/3089 707/E17.116 |
| 7,386,786 B2* | 6/2008 | Davis | .................. | G06F 17/3089 707/E17.116 |
| 7,877,392 B2* | 1/2011 | Grieselhuber | ...... | G06F 17/3089 707/748 |
| 7,895,080 B2* | 2/2011 | Haynes | .................. | G06Q 30/06 705/26.4 |
| 8,310,705 B2* | 11/2012 | Ogino | ................ | H04N 1/00411 358/1.15 |

(Continued)

*Primary Examiner* — Yosef Kassa
(74) *Attorney, Agent, or Firm* — Law Office of John Dalley; Jason Marin

(57) ABSTRACT

This invention is directed to a method of creating a PXLgram using a programmable device connected to a video display, comprising the steps of: creating an image library, wherein at least one image is stored; selecting one image to be an overlay image; setting the scale; selecting one or more images to be grid images; creating a grid having tiles arranged in rows and columns; populating each tile of the grid with one of the grid images; overlaying the grid of grid images with the overlay image; and assigning a degree of transparency for the overlay image. Another aspect of this invention is a website that allows users to create PXLgrams, which can be used in advertisements. The invention is also directed to the rapid transmission of a library of images in a very short period of time, and that can manipulated in to unique sets of images.

12 Claims, 14 Drawing Sheets

(56) References Cited

U.S. PATENT DOCUMENTS

| | | | | |
|---|---|---|---|---|
| 8,390,669 B2* | 3/2013 | Catchpole | .......... | G06K 9/00288 |
| | | | | 348/14.08 |
| 8,559,034 B2* | 10/2013 | Mori | .................. | H04N 1/00411 |
| | | | | 358/1.15 |
| 8,605,310 B2* | 12/2013 | Ebi | ...................... | H04N 1/0035 |
| | | | | 358/1.14 |
| 8,819,028 B2* | 8/2014 | Luo | .................. | G06F 17/30896 |
| | | | | 707/748 |
| 9,070,046 B2* | 6/2015 | Geng | ................ | G06F 17/30864 |

\* cited by examiner

METHOD OF CREATING A PXLGRAM

This application claims the benefit of U.S. Provisional Patent Application No. 62/285,643, filed Nov. 3, 2015, and U.S. Provisional Patent Application No. 62/387,059, filed Dec. 21, 2015.

BACKGROUND OF THE INVENTION

Field of the Invention

This invention is directed to methods of creating PXLgrams with a computer, wherein the PXLgram is created using one image as the overlay image and 1 or more grid images. The invention is also directed to a device for creating PXLgrams and a storage device containing the software that allows the user to practice a method of the present invention.

Related Background

A Pxlgram (pronounced like "pixel-gram") is a layered collage created with a computer or similar device. It involves putting pictures or images together in a grid or matrix (or some other pattern) and overlaying another image over them, but the overlaid image is generally partially transparent. Thus, the underlying pattern of images can be seen to a greater or lesser degree through the overlaid image, thereby creating a unique collage with a layer effect.

This may be further modified by the placement of the underlying images such that the color (chrominance) and/or brightness (luminance) of the images is taken into consideration when placing them in the pattern so that they better match with the portion of the image that will be overlaid. Thus, for example, based upon color or chrominance, if the image to be overlaid has a portion with a lot of blue in it and another with a lot of red, then you would take images that have lots of blue tones and place them so they will lie under the blue portion of the overlaid image. Similarly, you would place images having red tones in the area that will lie under the red containing portion of the overlaid image. In the alternative, you could reverse this (i.e. placing images with generally contrasting color under the portions of overlaid image, such that they clash) to create a different "feel" to the collage. The same thing can be done with a focus on brightness or luminance.

SUMMARY OF THE INVENTION

This invention is directed to a method of creating a PXLgram using a programmable device connected to a video display, comprising the steps of: creating an image library, wherein at least one image is stored; selecting one image to be an overlay image; setting the scale; selecting one or more images to be grid images; creating a grid having tiles arranged in rows and columns; populating each tile of the grid with one of the grid images; overlaying the grid of grid images with the overlay image; and assigning a degree of transparency for the overlay image.

Another aspect of this invention is a website that allows users to create libraries or albums of images and then use them to create PXLgrams. The users can share their images and the PXLgrams they create with them with other users or they can email them to whomever they wish to share them with.

The invention is also directed to creating advertisements using PXLgrams. For example, a seller can create a catalog wherein the overlaid image contains the business name and trademark, and the underlying images are of the sellers various items for sale.

Another aspect of this invention is the rapid transmission of a library of images, containing hundreds or thousands of images, in a very short period of time.

This invention is also directed to a method of creating a preview PXLgram using a programmable device connected to a video display, comprising the steps of: selecting one image to be an overlay image; setting the scale; randomly selecting one or more images to be grid images; creating a grid having tiles arranged in rows and columns; populating each tile of the grid with one of the grid images; overlaying the grid of grid images with the overlay image; and modifying the degree of transparency of the overlay image and the scale in real time until the desired appearance is achieved.

Another aspect of the present invention is a method of communication that allows an individual to select and send a set of images to any number of other individuals, who can then view the set of images, as well as images outside the set of images, and then create and send their own set of images in a seamless manner. This method of communication is comprised of the steps of selecting one or more images from an image library, and thereby creating a first set of images; sending an electronic communication to one or more individuals that contains a link to a webpage, wherein the webpage displays the first set of images created in step a.; clicking on the link contained in the communication allows an individual to view the webpage displaying the first set of images selected in step a.; selecting one or more images from the first set of images and/or from other images contained in the image library, thereby creating a second set of images; sending an electronic communication to one or more individuals that contains a link to a webpage, wherein the webpage displays the second set of images created in step d.; and wherein, steps c, d and e can be repeated indefinitely, and with every repetition creating a new set of images that can be sent to any number of recipients, who can create and send more sets of images.

BRIEF DESCRIPTION OF THE DRAWING

The following drawings form part of the specification. The drawings are to help provide a better understanding of the invention, in general, and some embodiments specifically. The drawing should not be viewed as limiting the scope of the invention, as it does not encompass all the possible embodiments.

DETAILED DESCRIPTION OF THE INVENTION

Figure 1:
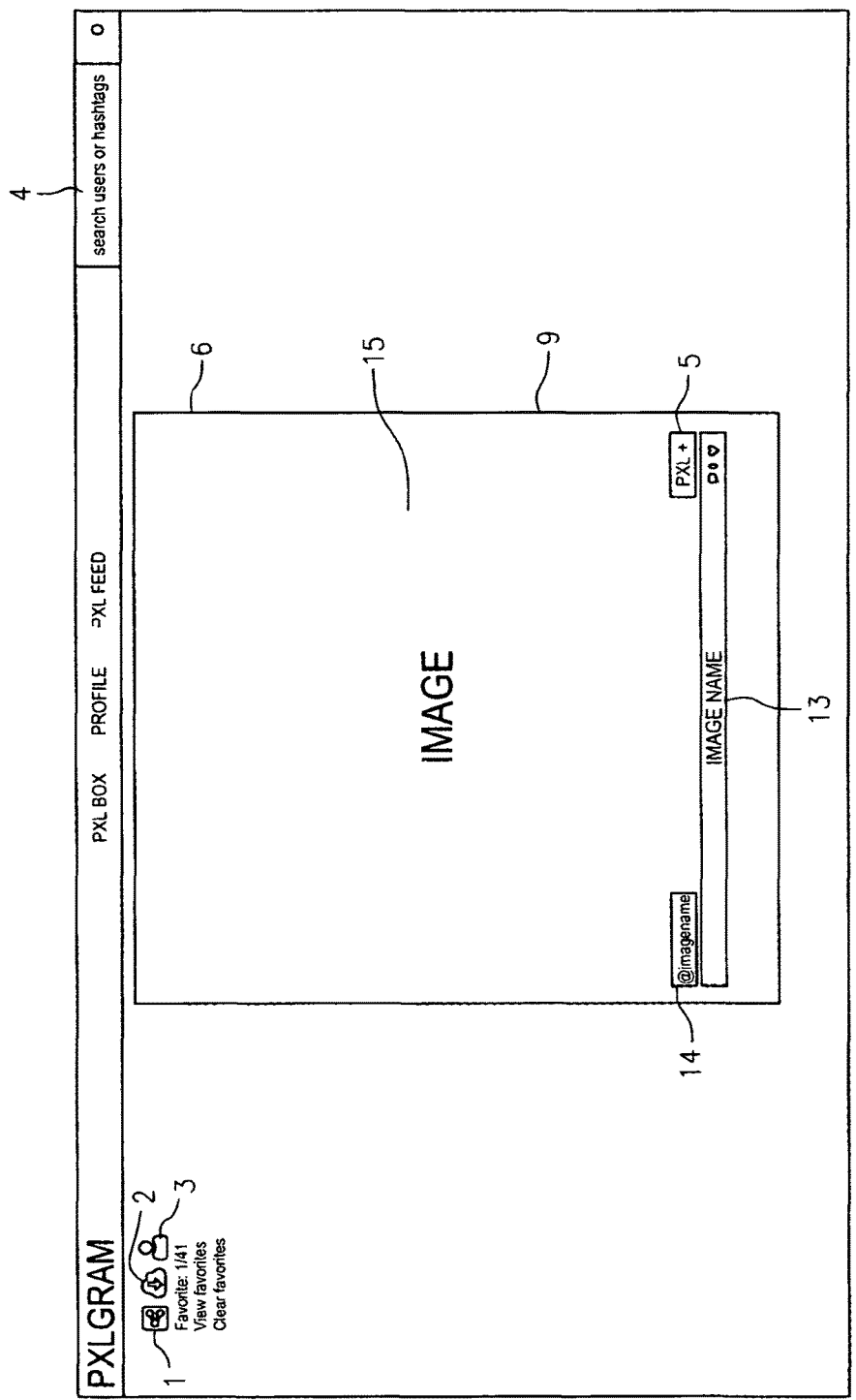
FIG. 1 is a screen shot of a webpage displaying a PXLgram in the PXLgram viewer.

This invention is directed to a method of creating a PXLgram using a programmable device connected to a video display, comprising the steps of creating an image library, wherein at least one image is stored, selecting one image to be an overlay image, setting the scale, selecting one or more images to be grid images, creating a grid having tiles arranged in rows and columns, populating each tile of the grid with one of the grid images, overlaying the grid of grid images with the overlay image, and assigning a degree of transparency for the overlay image.

For the purposes of this invention the term "PXlgram" (pronounced like "pixel-gram") refers to a layered collage created with a computer or similar device, wherein images are arranged in a grid or matrix (or some other pattern) comprised of tiles. Each tile in the grid can be of any shape, but typically is a rectangle or square (which is simply a rectangle have 4 sides of equal length). Then another image is overlaid over them, but the overlaid image is generally partially transparent. Thus, the underlying pattern of images can be seen, to a greater or lesser extent depending on the degree of transparency, through the overlaid image. Thereby creating a unique collage with a layered effect.

One of ordinary skill in the art would recognize that the arrangement of tiles (i.e. the grid) could be of any shape, such as a circle or a polyhedron, such as a hexagon. Just as an image can be cropped into any number of shapes, the grid can be made to replicate any shape. Additionally, the tiles do not need to be rectangles, but could instead be circles, hexagons, octagons or any other 2-dimensional shape. In one embodiment of the present invention the tiles are equisized rectangles or squares. In another embodiment of the present invention, the grid is shaped like a rectangle or square.

For the purposes of this invention the term "image library" refers to a directory containing a collection of images that may be used either as an overlay image and/or as grid images. The images may be in any number of digital formats commonly used, for example, such as DPX, EXR, GIF, JPEG, JPEG-2000, PDF, PHOTOCD, PNG, Postscript, SVG, and TIFF. This is not an exhaustive list and one of ordinary skill in the art would know of other commonly used or appropriate image formats.

Images can be scanned in or uploaded from the user's computer, and can also be imported from other websites, such as, for example Facebook®, Flickr®, and Picassa® (this not intended to be an exhaustive list), in order to create an image library. Additionally, the term "album" is used to describe the same concept and these terms are, for the purposes of this invention, the same.

Video can be also be stored in the library and used in PXLgrams, as described herein. The video can in any number of formats. Common ones include WebM, Flash Video, F4V, Vob, Ogg Video, Dirac, AVI, Quick Time File Format, Windows Media Video, Real Media, Real Media Variable Bitrate, Advanced Systems Format, and any of the MPEG formats. This list is not intended to be an exhaustive list. Skilled artisans would be aware of video formats that are used to digitally store video.

For the purposes of this invention the term "computer" refers to a device that is programmable and designed to automatically carry out a sequence of arithmetic or logical operations. More specifically, it is capable of running or implementing the software that practices the present inventive method. The computer may be a personal computer, i.e. a laptop or desktop home computer, a server, or a mobile device, for example, such as a tablet (for example an iPad®), a smart phone (for example an iPhone®) or similar devices. The term computer also refers to two or more computers that are networked together. One of ordinary skill in the art would understand what is meant by network. The following are examples of networks: PAN, LAN, WAN, WLAN, VLAN, SAN, MAN, VPN, backbone networks, and private enterprise networks. Similarly, the term computer also refers to two or more computers connected via the Internet, i.e. what has become commonly known as World Wide Web.

For the purposes of this invention the term "storage device" refers to a device for recording or storing information or data, such as a computer program. Ideally the storage device is capable of being connected to a computer or is readable by a computer. Examples of devices capable of being connected to a computer are: a hard drive, a thumb drive, and Solid State Drives (SSD). Examples of devices that are computer readable are: CDs, DVDs, floppy disks and encoded microchips.

For the purposes of this invention the term "grid image" refers to the images that will be used to populate the tiles, which are arranged in a grid or a matrix, thereby creating a collage of sorts. In one embodiment of the present method, the minimum number of images selected to be grid images is 10.

Additionally, a grid image can also be a video. When a video is used as a grid image, a single frame from the video will be used. However, when moused-over or high-lighted the grid image will appear as a GIF (which will repeatedly play a few seconds of the video), but when clicked on or selected, a video player is opened and the video is played.

For the purposes of the present invention the term "arrangement" refers to the pattern that is formed by the grid. In one preferred embodiment of the present method, the arrangement is a grid or matrix, where the tiles are arranged in rows and columns forming a square or rectangle, and wherein the tiles, or the grid images populating the tiles, are rectangular or square in shape. In another embodiment of the present method, the tiles, or the grid images populating the tiles, can be cropped into circles, hexagons, octagons or some similar shape and then arranged in circular or oval-like arrangement. One of ordinary skill in the art would readily see how the grid images can be cropped into various shapes and then arranged so that collage as a whole could be made in any number of shapes.

For the purposes of this invention the term "overlay image" refers to the image that will be overlaid over the arrangement of grid images. The overlay image can be cropped into any shape to match the shape of the desired arrangement. In the preferred embodiment of the method, the arrangement will be rectangular and divided up into a grid or matrix forming rows and columns, and the grid images will be rectangular in shape, and the overlay image will be rectangular in shape.

Resizing of the images, whether they are selected to be grid images or as the overlay image, may need to be done to provide a more uniform appearance and avoid gaps. One of ordinary skill in the arts would be aware of how to resize images.

In one embodiment of the present invention, resizing is done by cropping a 300×300 pixel area from the original image. In a more preferred embodiment, the cropping is based on the center of the top of the image. Thus for example, if an image to be resized is 500×500 pixels, then the center of the top of the image would be at $250^{th}$ pixel (in a matrix the coordinates for this pixel would be {250,001}), and therefore the cropping would start at pixel 100 (250-150) and end at pixel 400 (250+150). The resulting 300×300 square would have corner pixels at the following coordinates: {100,001}, {400,001}, {100, 300} and {400,300}.

For the purposes of this invention the term "populate" refers to placing the grid images into the tiles of the arrangement. This can be done in several ways.

One way to populate the arrangement is to allow the user to select where to place each and every grid image.

Another way to populate the arrangement is to use a random number generator to randomly place the images. A skilled artisan would be familiar with random number generators and how to use them to get a more or less random placement of the selected grid images.

A more preferred way of populating the arrangement is where the population step is divided into the following sub-steps: dividing the overlay image into a grid of tiles, corresponding to, and matching in size, the pattern or shape that the grid images are, or will be, arranged in. Then every tile of the overlay image is analyzed for chrominance and a chrominance value (CVo) is assigned to the corresponding tile of the arrangement that the grid images will be populated into. Next every image selected to be a grid image is analyzed as a whole for chrominance and assigned a chrominance value (CVg). Lastly, the grid images are placed or populated by matching the Chrominance value (CVg) of the grid image to tile of the overlay image having the closest chrominance value (CVo).

Similarly, another preferred way of populating the arrangement is where the population step is divided into the following sub-steps: dividing the overlay image into a grid of tiles, corresponding to, and matching in size, the pattern or shape that the grid images are, or will be, arranged in. Then every tile of the overlay image is analyzed for luminance and a Luminance Value (LVo) is assigned to the corresponding tile of the arrangement that the grid images will be populated into. Next every image selected to be a grid image is analyzed as a whole for luminance and assigned a Luminance value (LVg). Lastly, the grid images are placed or populated by matching the Luminance value (LVg) of the grid image to tile of the overlay image having the closest Luminance value (LVo).

In a preferred embodiment of the present invention, wherein the arrangement is rectangular in shape and divided in to a grid formed by rows and columns of rectangular tiles, the sub-steps for populating the grid based upon chrominance are:

f1. the overlay image is divided by equisized tiles, that are rectangular in shape, forming a grid equal in size and the number of tiles as the grid created in step e.;

f2. analyzing each tile of the overlay image for chrominance and assigning a chrominance value (CVo) to the corresponding tile of the grid created in step e.;

f3. analyzing every grid image, as a whole, for chrominance and assigning a chrominance value (CVg) to that image; and f4. populating each tile of the grid created in step e. with a grid image having the chrominance value (CVg) closest in value to the chrominance value (CVo) assigned to each tile of the overlay image.

In another preferred embodiment of the present invention, wherein the arrangement is rectangular in shape and divided in to a grid formed by rows and columns of rectangular tiles, the sub-steps for populating the grid based upon luminance are:

f1. dividing the overlay image into equisized tiles, that are rectangular in shape, forming a grid equal in size and the number of tiles as the grid created in step e.;

f2. analyzing each tile of the overlay image for luminance and assigning a luminance value (LVo) to the corresponding tile of the grid created in step e.;

f3. analyzing every grid image, as a whole, for luminance and assigning a luminance value (LVg) to that image; and f4. populating each tile of the grid created in step e. with a grid image having the luminance value (LVg) closest in value to the luminance value (LVo) assigned to each tile of the overlay image.

There are also multiple matching algorithms that may be used. In one embodiment the image matching is done using Haar wavelets, as described in C. Jacobs, A. Finkelstein, and D. H. Salesin, *Fast Multiresolution Image Querying*, Proceedings of SIGGRAPH 95, In Computer Graphics Proceedings, Annual Conference Series, 1995, which is hereby incorporated by reference.

In another embodiment the image matching is performed using a subpixel metric, wherein the algorithm used is:

if (float_image==0)
float_image=(float*)malloc(sizeof(float)*NUM_SUBPIXELS*NUM_CHANNELS);
scaled_data=scale_image(image_data, image_width, image_height, x, y, width, height, NUM_SUBPIXEL_ROWS_COLS, NUM_SUBPIXEL_ROWS_COLS);
for (i=0; i<NUM_SUBPIXELS*NUM_CHANNELS; ++i)float_image[i]=scaled_data[i];

A skilled artisan would be aware of other ways to effectuate the populating of the grid with grid images.

For the purposes of the present invention the term "transparency" refers to the degree that one can see through an image. For example, if an image is 100% transparent it will be effectively invisible to the viewer, whereas if it is 0% transparent, then nothing can be seen through it and it appears solid. Between these to two points, an overlay image will allow grid images below it or under it to be seen to some greater or less degree. The transparency of the overlay image is also referred to as "clarity", wherein 100% clarity equals 0% transparency. These terms are interchangeable for the purposes of this invention.

In one embodiment of the present method, transparency of the overlay image can be modified by the user is real time by adjusting a slide control.

In another preferred embodiment of the present method, the transparency can be adjusted via a slide control along a scale of 0 to 30, wherein 30 equals 0% transparency (i.e. the image is invisible), 0 represents 100% transparency (i.e. none of the grid images can be seen through the overlay image) and each number between equals 3.33% (i.e. 1=3.33%, 2=6.66% etc. . . . ).

For the purposes of the present invention the terms "scalability" or "scale" refers to size and number of tiles in the arrangement. For example, if the arrangement is rectangular in shape, the smallest size and number of rectangles in the grid would be a 2×2 matrix, wherein the grid would have 2 rectangles in a row and 2 rectangles in a column. This can be scaled up to a maximum of 100×1000 matrix; meaning a grid having 100 rectangles in a row and 100 vertical columns of 1000 rectangles.

In one embodiment of the present method, the scale can be adjusted by the user in real time by using a slide control.

In another preferred embodiment of the present method, the slide control for scalability can adjusted along a scale of 1 to 7, wherein if the scale is set to 1, then the grid will have the least number of tiles, and when the scale is set to 7, then the grid will have the maximum number of tiles.

For the purposes of this invention the term "slide control" refers to a control displayed on the screen of a computer monitor or display that can be manipulated using the key board or mouse in order to allow the user to change a setting. This control can be something that can be moved from side to side, up and down, or even be made to appear as a "dial" or knob that is turned, or simply a query box that allows a user to input a value. All of which will correspond to a setting of some sort. A general example of such a control that most computer users will be familiar with is a volume control, which allows a user to turn off the sound output or increase its volume to maximal output, or some level in between.

Another aspect of the present invention is a social website that allows the users to create PXLgrams as described herein. This website has numerous features as detailed herein.

A user of the social website will be able to create one or more libraries or albums by up loading images from their computer. The user can also up load images from other websites that he/she may be using, such as Facebook, Instagram, and Twitter. This is not meant to be an exhaustive list, and a skilled artisan would be aware of many other websites were images and video may be downloaded and used by the social website of the present invention.

The Profile Page.

The user will have a profile page. Any PXLgrams they create will be displayed on their profile page. Additionally, the website allows users to review the PXLgrams created by others. When viewing a PXLgram created by someone else, the user my mouse over it cause a "PXL+" button to appear. Clicking the "PXL+" button will cause that PXLgram to also be displayed in the user's profile. The user can also further personalize their profile page by up loading an image to be their cover image, which will be displayed as banner along the top of the profile page. Additionally, a user my up load an image to be their "profile image," which can a picture of themselves or any image that they want to represent themselves to the rest of the community, such as an "avatar".

When a user joins the website by creating an account they will be assigned a PXL Number. This is a unique identifier and also indicates to others users approximately how long the user has been a member of the website.

A user can also arrange the order of the albums and PXLgrams on their profile page. This is done by clicking on the item and "dragging and dropping" it in the desired location. Similarly, images within an album can be reordered by dragging and dropping them into the desired location.

The PXL Box Page.

Every user will also have a PXL Box page in addition to their profile page. On the PXL Box the user's albums will be displayed and new albums can be created. A "photo pool" is displayed on the PXL Box page that indicates the total number of albums and the total number of images that user has in their album(s). The PXL Box page is also where the user can create PXLgrams, as described herein.

PXL Feed.

A third page that the user has access to is their PXL Feed page. On the PXL Feed page the user can view PXLgrams that users have created that have not been designated as private. In the PXL Feed, PXLgrams appear to move across the page similar to a "crawl" on a newswebsite or stock prices on webpage about investing. A skilled media artisan would understand the concept of a crawl.

Additionally, the PXL Feed can be filtered. The user can either view the PXL Feed with everyone's PXLgrams (i.e. unfiltered) or the user can choose to view only the PXLgrams of other user that they have elected to "follow".

A user can search for PXLgrams on the PXL Feed page in several ways. The first is by user name. Searching by user names will return any PXLgrams created by that user. The second way of searching is by hashtag. Hashtags can be assigned to a PXLgram by the user. A PXLgram can more than one hashtag assigned to it. Searching by a hashtag will return all the PXLgrams assigned that hashtag.

When a user moves his cursor over a PXLgram, a number of buttons appear over the PXLgram. One is the "PXL+" button, which has been described herein. A second is an icon that allows the user to download the PXLgram as a "snap shot," which cannot be interacted with; it is only a static image of the PXLgram. Another icon allows the user to share the PXLgram with others by posting to their Facebook page or emailing it.

PXLgram Viewer.

If the user clicks on a PXLgram they are taken to the PXLgram viewer. When viewing a PXLgram in the viewer, the user can zoom in or zoom out by using their mouse wheel or similar device. The user can also click on any grid image and it will be enlarged so they can better view it in detail. Additionally, in the corner of the page is a small "navigation box" that allows the users to move quickly around the PXLgram by clicking on the white box (which represent the users current view within the enlarged PXLgram) and dragging it to the area the user now wishes to view. This is particularly useful when the user has zoomed in on the PXLgram to such an extent that it is larger than the display screen. One of ordinary skill in the art would be aware of the concept of "navigation boxes" and there use when moving around enlarged images, such as maps or merchandise.

There are several ways to effectuate the zoom-in feature on the PXLgram viewer page. One method is to remove the overlay image once the user has zoomed-in to a preset degree, such as when the PXLgram is larger than the display screen. Another method is to display the PXLgram with the transparency set to 0, such that the overlay image is essentially invisible and the grid images can be clearly seen, and then display the same PXLgram, wherein the transparency of the overlay image is as originally set when it was created, on top of the first PXLgram. Then once the user has zoomed-in to a set degree, the $2^{nd}$ PXLgram (wherein the transparency is as originally created) is removed from the display. The second method allows the use of PXLgrams in static formats, such as PNG or JPEG.

In the PXLgram View, a number of icons are displayed at the corner of the screen. A first is the icon for sharing, as described herein. A second is for downloading, which allows the user download a snap shot of the PXLgram (as described herein) and/or to download any of the grid images of their choosing. Another is a profile icon and when clicked on takes the user to the profile page of the creator of the PXLgram so that the user can view other PXLgrams that user has made or added to their profile page using the "PXL+" feature, as described herein.

Additionally, when the user mouses-over or high-lights a particular grid image, then a "check box" appears over the image (preferable in a corner). The user can designate an image as a "favorite" by clicking on, or "checking," the "check box." The user can also filter their albums and/or PXLgram gallery for images that have been designated as favorites. When downloading images, the user can selectively download only images designated as favorites as well.

In another embodiment of the method of the present invention, a preview PXLgram can be created. A preview PXLgram is a PXLgram that can be created and modified in real-time using the afore-mentioned slide controls. A preview PXLgram can only be created using random images as grid images. Thus, a preview PXLgram gives the user an idea what a PXLgram will look like when created (differing only in that the grid images are random selected from a library, instead of being chosen by the user), and allows them to modify the scale and transparency in order to get the desired look. This is advantageous, as it allows the user to quickly and easily get the desired appearance of the PXLgram without a lot of trial and error and/or the need to make a series of educated guess to achieve the desired appearance.

For the purposes of this invention the term "real-time" refers to something occurring with little or almost no delay or lag time as perceived by the average human. Thus, for example, if a control, which is responsible for some aspect of a PXLgram's appearance, is altered by the user, the PXLgram's appearance will change immediately in the corresponding manner.

One embodiment of the present method is to a create a preview PXLgram using a programmable device connected to a video display, is comprised of the steps of:

q. selecting one image to be an overlay image;
r. setting the scale;
s. randomly selecting one or more images to be grid images;
t. creating a grid having tiles arranged in rows and columns;
u. populating each tile of the grid with one of the grid images;
v. overlaying the grid of grid images with the overlay image; and
w. modifying the degree of transparency of the overlay image and the scale in real time until the desired appearance is achieved.

In another embodiment of the present method of creating a preview PXLgram, the tiles in the grid are rectangles or squares. In another embodiment of the present method of creating a preview PXLgram, the grid is arranged as a square or rectangle. Another embodiment of the present method of creating a preview PXLgram is where the populating of the grid images are performed based upon luminance, chrominance or combination of both, as described herein for the creation of PXLgrams.

New Features

Another aspect of the present invention, is where a user viewing the website via a computer or mobile device (such as a smart phone or tablet), can view PXLgrams as thumbnail images, but when they are clicked on (or tapped with a finger) the user is brought to a page displaying the grid images that comprise the PXLgram. These gird images will be displayed in a grid comprised of rows and columns, and every grid image will be numbered, starting from left-to-right across the top row (i.e. Row 1) and then continuing to the $2^{nd}$ row, the $3^{rd}$ row, and so on until all the grid images have a number associated with it. Each grid image is only displayed once.

On this page is also displayed a slide control that adjusts the size of the grid images. Thus, when the slide control is set to its lowest setting, and therefore the grid images are as small as can be displayed, the amount of columns in a row are between 1 and 20, and more preferably are between 1 and 10. As the slide control is adjusted to increase the size of the displayed grid images the number of columns in each row will be reduced to accommodate the larger images. Therefore, typically up to 20 columns of grid images can be displayed, and as the slide control is adjusted to increase the size of the grid images, the number of columns in each row will be reduced to a minimum of 1 to 5 columns of grid images, with 1 to 3 columns being preferable and 1 column being most preferable when the grid images are scaled to maximum size.

Additionally how a phone or tablet, in the case where the user is viewing the website on a mobile device, is oriented will also affect how many columns can be in each row. Thus, when the mobile device is oriented "vertically", such that the smaller sides of the rectangular screen are "up" and "down" and the large sides of the rectangular screen are "left" and "right", then the amount of columns in each row can be between 1 and 10, depending on the size of the images as determined by the slide control. In a preferred embodiment, this page is displayed with the grid images scaled to the smallest possible size and the slide control therefore at its minimum setting. As the slide control is adjusted to increase the size of grid images to the maximum setting, then rows will have only one column and each image will dominate the vertically oriented rectangular screen. If oriented "horizontally", such that the small sides of the rectangular screen are "left" and "right" and the large sides of the rectangular screen are "up" and "down", and the slide control for sizing is set to the minimum setting, then up to 20 columns of grid images can be displayed, and as the slide control is adjusted to increase the size of the grid images, the number of columns in each row will be reduced to a minimum of 1 to 5 columns of grid images, with 1 to 3 columns being preferable and 1 column more preferable.

If any of the grid images displayed on this page are selected by clicking or tapping on it, then the grid of grid images will be changed to display the selected grid image at maximum scale. On a vertically oriented mobile device, this means a grid having rows with just one column and the selected grid image will dominate to screen. On a horizontally oriented mobile device, the grid will have 2 to 3 columns or more preferably just 2 columns, and the selected grid image will be displayed such that it will fill the vertical space of the screen, but with sufficient horizontal space on the screen remaining to allow 1 or 2 of the subsequently numbered grid images to be displayed in adjacent columns or an adjacent column.

The displayed grid image, or grid images, will now have a "check box" associated with it, or them. The "check box" can be superimposed over a portion of the grid image, such as in corner so as to not detract from the aesthetics of the image, or can appear above, below or to either side of the grid image(s) displayed. Preferably it is superimposed over the grid image for maximum clarity for the user and maximum use of display space on the screen. The "check box" is initially displayed, but once it is clicked or tapped on, it will be displayed shaded or in another color, which indicates that the grid image has been selected. Additionally, various virtual buttons will be displayed on this page, such as the "select all" button.

The "select all" button will be initially displayed on this page. Clicking or tapping this button will select every grid image.

In another embodiment of this invention, a "select" button would be displayed when the all the grid images are displayed, regardless of slide control setting or the scaling of the size of the grid images. Clicking the button to turn on this feature allows the user to select grid images. Thus, this is an alternative way to select grid images without the need to have the grid images scaled up in size (i.e. zoomed in on).

Once at least one grid image has been selected, i.e. the "check box" is displayed shaded or in another color, other buttons will appear: the "clear all" button and the "share" button.

The "clear all" button, if tapped or clicked on, will deselect all the grid images, i.e. the "check boxes" will be displayed un-shaded or in the original color.

The "share" button only appears when at least one grid image has been selected. Clicking or tapping on this button will cause one or more buttons to be displayed. One button will allow the user to either email the selected grid images as a link to himself and/or anyone else. Thus, the recipient upon opening the email will see the grid images selected by the sender, but they are just links that will direct him to a page containing the selected grid images. Another button will let the user post the selected grid images as a link directly to a social media website, such as Facebook®, Twitter® or Instagram® (this is not intended to be an exhaustive list). Another button will let the user save the selected grid images to their own PXLbox (as described herein), where the grid images will be permanently saved and the user can use these images to create other PXLgrams. A "filter" and/or "unfilter" icon can also be displayed on this page.

The "unfilter" icon, if clicked or tapped on, will cause all of the grid images that comprise the PXLgram to be displayed, not just the selected ones. Whereas, the "filter" icon will cause only the selected grid images to be displayed. The filter/unfilter icon can be an icon with the words "filter" or "unfilter" appearing thereon or it can be an image that appears one color when not selected and another color or shaded to indicate it has been selected. One skilled in the art would be familiar with this concept.

Thus, a user can scroll or flip through all of the grid images and select some images, then click on the "filter" icon to view the selected images, and then click or tap on the "unfilter" icon to display all the grid images again so the user can continue to review and select grid images. Thus, this allow the user to review what he has selected up that point, which can be advantageous if they are many grid images comprising the selected PXLgram, as some PXLgrams may have hundreds of grid images comprising them. When all of the grid images are displayed on the page, then the "filter" button will also be displayed. On the contrary, once the "filter" button has been clicked, so that only the selected grid images are displayed, then the "unfilter" button will be displayed instead of the "filter" button. As stated above, alternatively, the filter/unfilter button may be an icon that is shaded or changes color to indicate when it is active or inactive.

It is also important to note that after selecting and sharing any grid images, the user is not redirected away from the page allowing them to seamlessly continue their experience. Thus, the user can review hundreds of grid images, select some and share them with their Facebook page, click the "unfilter" icon, and then select some other grid images and email them as a link to a friend or colleague, and then click the "unfilter" icon again and select some other grid images to email to another person, or they can click on the "link" icon that will direct the user to the profile page of the user that created the original PXLgram.

A "link" icon can be associated with every grid image, and can appear superimposed over a portion of the grid image, such as in a corner so as not to detract from the aesthetics of the image, or can appear near the grid image, similar to the "check box" described herein. Clicking or tapping on the "link" icon will direct the user to a page selected by the user who originally associated the link to that image. Typically, the "link" icon will direct the user to the profile page of the user who used this grid image to create the original PXLgram, or if the user is a retailer, it can be the retailer's website, where an on-line purchase can be made. This feature is important to note for its marketing potential. For example, a retailer can create PXLgrams that are comprised of grid images of their merchandise. A user can then view the images and link back to the retailer's own website. Thus, the user, with one click, can go from viewing an image of the merchandise they are interested in, to being at the retailer's own website making a purchase of that merchandise. Additionally, as other users like the various images in the retailer's catalog, they can be used to create other PXLgrams, which in turn may catch the eye of another user and that user can link back to the retailer's website, thereby allowing a retailer to virally market their merchandise.

Recipients of emailed grid image links can also click on the grid images and be directed to a page containing the selected grid images that were sent to them. The recipient can then select some or all of these grid images and share them by posting them as a link to their Facebook® page (or some other social media website), save them to their own PXLbox page, or email them as link to others, and so on. Thereby creating a collaborative atmosphere where users can share content and use the content sent to them to create new content, in the form of PXLgrams, as an example.

Thus, this is advantageous since it does not require the emailing of large amounts of data that may need to be compressed and then uncompressed. For example, a photographer can upload numerous photos and allow clients to view them, and one client could then select which photos they like most, and send a link via email of just those selected images to another 3$^{rd}$ party for evaluation, and the 3$^{rd}$ party can then select which photos they liked (from those selected by the client) and then email a link to just those photos. One can easily imagine a wife using this to select her favorite images from her wedding and then emailing a link to those select images to her husband, who could then choose which images he likes best (out those selected by his wife) and send a link to them to his wife and/or the photographer. All of this can be accomplished quickly and easily without the need to compress and uncompress large amounts of data or be constrained by on-line providers maximum data limits.

In another embodiment of the invention, a "buy" button will be displayed that allows a user to make a purchase without needing to be redirected to another site. The "buy" button would be associated with a grid image, similar to the "link" icon, and allow a one click purchase of the item displayed in the grid image that it is associated with. Obviously, this feature would have the advantage of allowing a user to make a purchase without needing to be redirected to other pages, thus, interrupting their viewing experience.

Additionally, information can be associated both with PXLgrams and the individual grid images that comprise them. When information is associated with an image or a PXLgram, an "information" icon will appear at its edge. Clicking the icon will bring up a text box with the information contained therein. The text box can be dismissed as usual, by clicking the "x" in the corner. This allows a user to provide information about his creation (i.e. a PXLgram) and about the images that comprise it. Thus, an artist can create a PXLgram using his various related pieces from a collection, and use the PXLgram as a catalog, where he can associate information discussing the collection in general and also associate information specific to each image (i.e. piece) within the collection that is also used to comprise the PXLgram. This is incredibly powerful for marketing, as you can not only inform the public about what you are selling (i.e. specifications), but also where it can be purchased and provide other information or specifications that a purchase would want to know about the product.

In another embodiment of the present method, a grid image can be viewed in its original format (i.e. prior to resizing or cropping) by clicking the "original image" icon. This is very useful to photographers and artist or those displaying such works, such as a gallery. This way photos and images of paintings, tapestries, statues, etc. . . . can be cropped or resized to focus on a specific section of the image or just so that it fits as a grid image (if it were strangely shaped for instance), but the viewer can still see the original image as the artist intended or so a potential purchaser can view the item he is thinking of buying in its entirety. The "original image" icon will appear super-imposed over the associated image, usually at the edge.

Another aspect of the present invention is a method of communicating that allows an individual to select and send a set of images to any number of other individuals, who can then view the set of images, as well as images outside the set of images, and then create and send their own set of images in a seamless manner.

Another way to describe this method of communication is that the individual selecting the images from the image library is activating a "filter" that hides (i.e. does not display) any images that were not selected. Then the individual sends the selected images, which are really the filtered image library, wherein only the selected images are displayed, to the recipient. Thus, the recipient can view the displayed selected images, but can deactivate the filter to also view the entire image library. The recipient can also select images from the image library and send them to other individuals, which again is the image library that has been filtered to hide the images not selected. Therefore, another way of thinking about this method of communication is that it allows individuals to customize a filter for an image library so that only the selected images are displayed until the recipient deactivates the filter.

For the purposes of this invention the term "filter" refers to selecting one or more images (or data etc. . . . ) and the images not selected are no longer displayed and therefore, effectively hidden from the viewer.

This method of communicating is comprised of the steps of selecting one or more images from an image library, and thereby creating a first set of images; sending an electronic communication to one or more individuals that contains a link to a webpage, wherein the webpage displays the first set of images created in step a.; clicking on the link contained in the communication allows an individual to view the webpage displaying the first set of images selected in step a.; selecting one or more images from the first set of images and/or from other images contained in the image library, thereby creating a second set of images; sending an electronic communication to one or more individuals that contains a link to a webpage, wherein the webpage displays the second set of images created in step d.; and wherein, steps c, d and e can be repeated indefinitely, and with every repetition creating a new set of images that can be sent to any number of recipients, who can create and send more sets of images.

Another way of describing the present method of communicating, is that it is comprising the steps of: f. selecting one or more images from an image library, and thereby creating a first filtered image library; g. sending an electronic communication to one or more individuals that contains a link to a webpage, wherein the webpage displays the first filtered image library created in step f.; h. clicking on the link contained in the communication allows an individual to view the webpage displaying the first filtered image library in step f.; i. selecting one or more images from the first filtered image library and/or from the image library, wherein the filter has been deactivated, thereby creating a second filtered image library; and j. sending an electronic communication to one or more individuals that contains a link to a webpage, wherein the webpage displays the second filtered image library created in step i.; wherein, steps h, i and j can be repeated indefinitely, and with every repetition creating a new filtered image library that can be sent to any number of recipients, who can create and send more filtered image libraries.

Using this method of communicating images allows an individual ("the initial sender") to view all the images in the image library, that they created by uploading their own images or by downloading images on-line, and selecting which ones they want to send. An image or group images selected by the individual is a set of images. This set of images can then be sent to other individuals. This is done by sending an electronic communication containing a link to a webpage displaying the set of images.

In another embodiment of the present inventive method of communication, the electronic communications can contain written statements, text and/or icons (such as emojis).

The term "electronic communication" for purposes of this invention means an email or social media messages or postings, such as for example a tweet, an instant message, a direct message, a Facebook postings or a similar way of sending data electronically. This is not intended to be an exhaustive list, and a skilled artisan would be aware of other potential ways of sending data electronically.

Once it is received by these other individuals, the receiving individuals can view the set of images, but they can also view all of the images that the initial sender viewed (i.e. the entire image library, by deactivating the filter), and can then select images (from the entire image library) to create their own set of images (i.e. customize the filter). This created set of images can then be sent on to other individuals (via an electronic communication containing a link to a webpage displaying the created set of images).

In another embodiment of the present invention, individuals receiving the electronic communication and also add to the image library by uploading/downloading additional images.

Thus, the present method of communicating allows individuals to communicate sets of images between each other, wherein they can quickly and seamlessly view, select and send images and sets of images, without needing to waste time by downloading images (once the image library is set up, and which is stored on a server of the provider of the service). Thus, a core aspect of the method is the quick manipulation of images in sets (i.e. customizing the filter to display only the selected images). The advantage offered by this method is that by sending a link to a webpage displaying the selected images, the communication can be sent and delivered quickly without needing to have the recipient wait for images to download to their device or having their devices memory consumed by having to store all the images. However, once the link takes the recipient to the webpage displaying the set of images, the webpage is not static. The recipient, as noted herein, can also view all the images in the image library, including those not selected as well with the click of a virtual button, and then select some or all of them when create their own set of images.

An example of how this method can be used: imagine three people (P1, P2 & P3) looking to rent an apartment together. Further imagine that a realty company, using a service provider employing the current inventive method, up-loaded all of the company's rental listing with the associated pictures of the various properties. Then P1 can review the listings and associated images and select his favorites (I2, I5 & I8), thereby creating a first set of images. P1 then send the first set of images to P2 and P3. P2 receives the email, clicks the included link and views the displayed first set of images. P2 like I5 and I8, but not I2, so P2 clicks the virtual button and also reviews all of the images; liking I9. P2 then creates a second set of images, which includes I5, I8 and I9, and sends it to P1 and P3. P3 can then view both sets of images (i.e. the first set of images and the second set of images) as well as all of the realty company's listings, and select which every ones he likes the best to create a third set of images to send to P1 and P2. The three people can continue in this way until they find 1 or 2 apartments they all agree upon, and this can all be done in just minutes while leisurely and seamlessly viewing and sharing images on their smart phones or tablets while commuting to work or home, eating lunch or any other activity that allows them to use a mobile electronic device.

One can also imagine how the above-described example could just as easily be casting directors viewing the actors or actresses of a talent agency or models from a modeling agency in order to fill roles in a movie or a commercial. Similar examples can be easily imagined. In fact, any items that can be easily viewed as image can be shopped for or discussed between groups of people using the present inventive method, as described herein.

The only limit is the technology for storing content on servers, which is always expanding. Thus, with a sever farm big enough, thousands, tens of thousands or even millions of images can be included in libraries and used to create sets of images and shared with any number of people.

Retailers can use this technology to better serve their customers and increase sales. Similarly restaurants can put their menus on-line with pictures of their food. Galleries can market and sell art. The possibilities are nearly unlimited.

DETAILED DESCRIPTION OF THE DRAWINGS

FIG. 1 is a screen shot of a webpage displaying a PXLgram 6 in the PXLgram viewer. The Pxlgram 6 is comprised of numerous grid images 9 with a partially transparent overlay image 15 superimposed over them. In the upper-left corner of the webpage are the sharing icon 1, the downloading icon 2, and the profile icon 3; these icons will allow the user to share or download a snap shot of the PXLgram and/or the images comprising it. The name of the user 14 who created the PXLgram 6 and the name 13 given to the PXLgram 6 are displayed on the bottom of the PXLgram 6. When the cursor is placed over the PXLgram 6, the PXL+ button 5 is shown. The search box 4 is shown located in the upper-right corner of the webpage, and allows the user to search by user name or hashtags.

Figure 2:
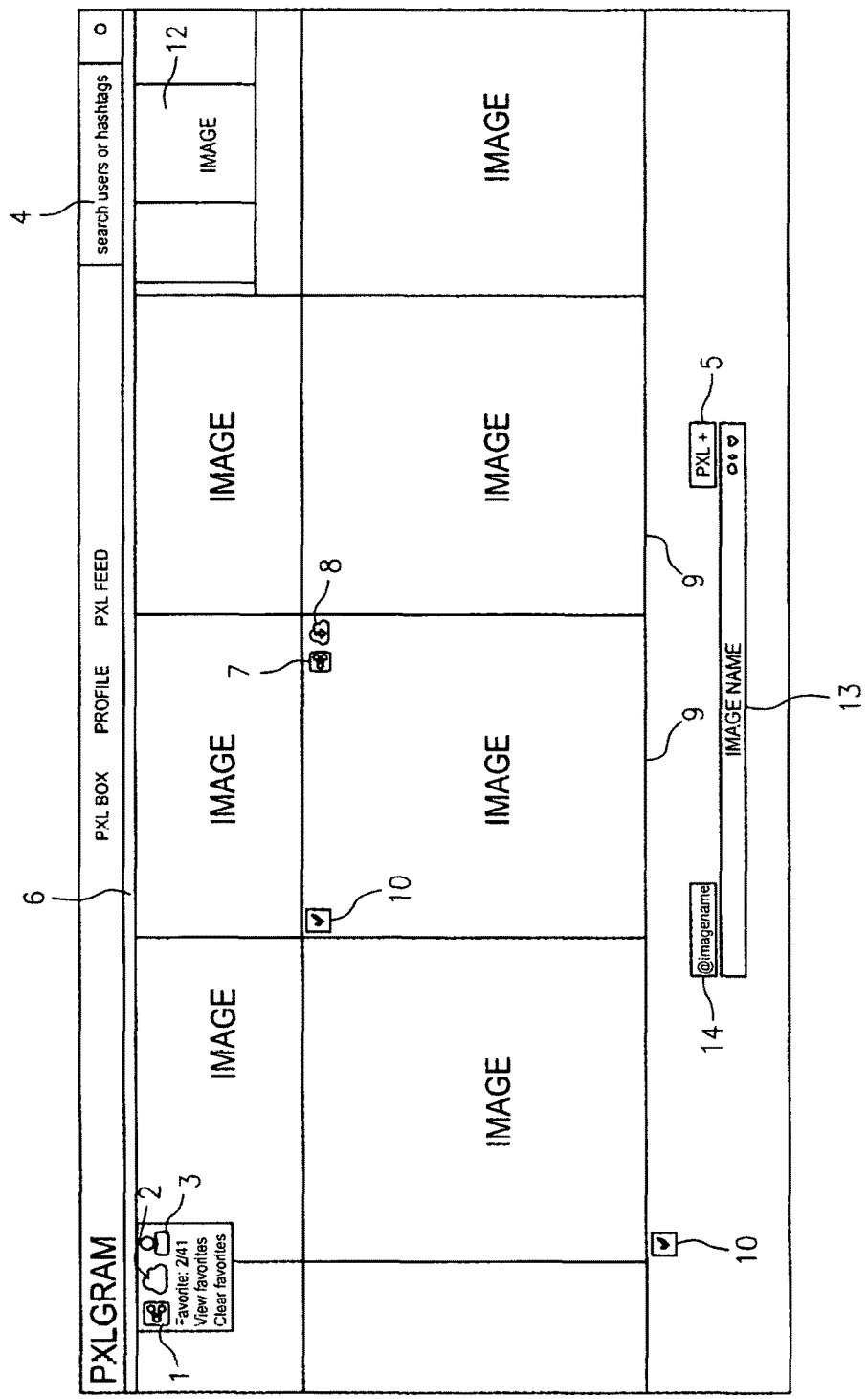
FIG. 2 is a screen shot of a webpage displaying a PXLgram in the PXLgram viewer which has been zoomed in on to better show some of the grid images used in the PXLgram.

FIG. 2 is a screen shot of a webpage displaying a PXLgram 6 in the PXLgram viewer which has been zoomed in on to better show some of the grid images 9 used in the PXLgram 6. In the upper-left corner of the webpage are the sharing icon 1, the downloading icon 2, and the profile icon 3. Similarly, when one of the grid images 9 are moused-over the sharing icon 7 and the downloading icon 8 appear, and these icons are specific to that grid image 9; meaning only that grid image 9 will be shared or downloaded. Small checked boxes 10 appear in the upper-left corner of grid images 9 that have been marked as favorites. The PXL+ button 5 will be displayed as long as the cursor is over any portion of the PXLgram 6. The search box 4 is displayed in the upper-right corner of the page, and functions as described herein. A navigation box 12 appears directly below the search box 4 and shows the user where their view (represented by the white rectangle) on the screen is relative to the whole PXLgram 6 when the user has zoomed in such that the screen can no longer show the whole PXLgram 6.

Figure 3:
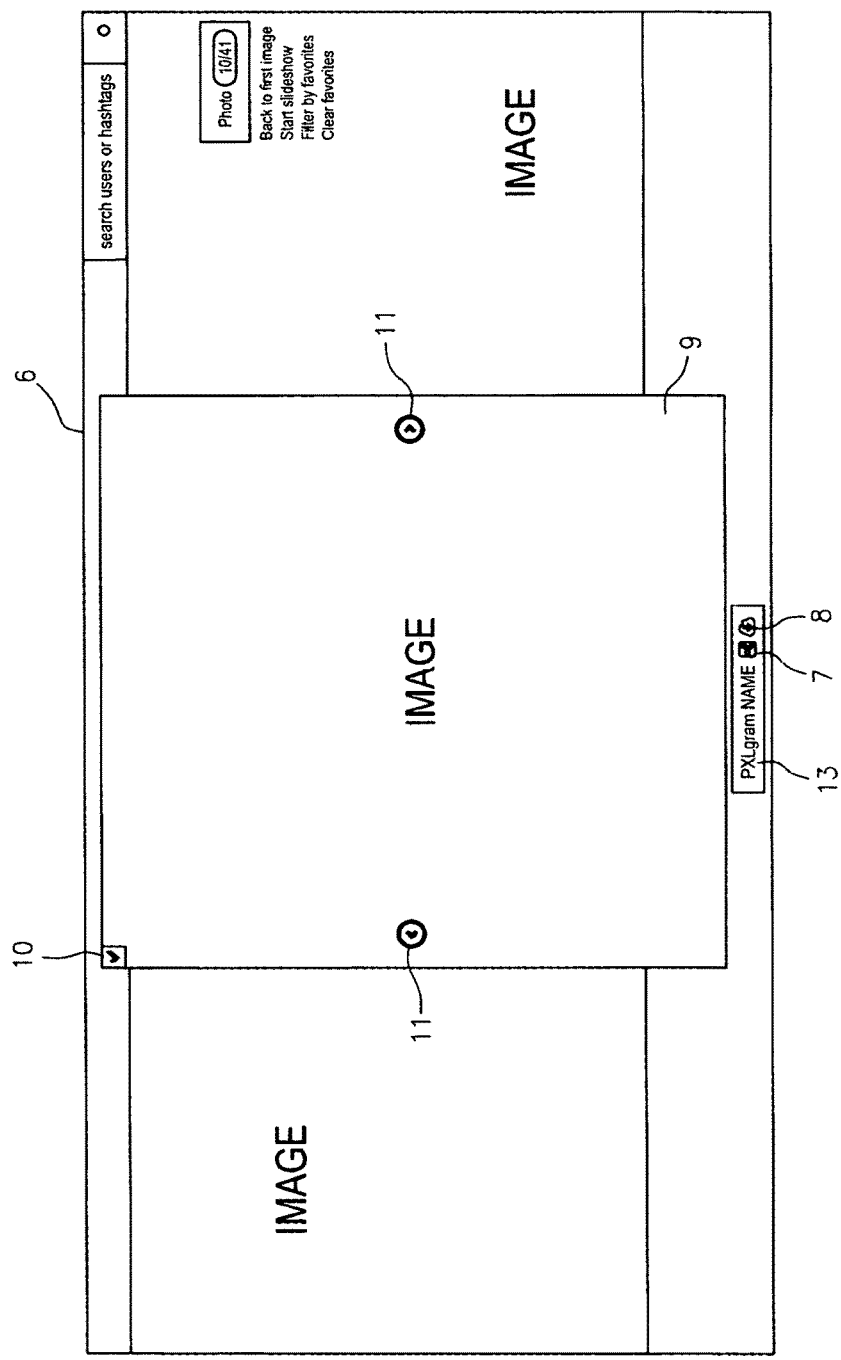
FIG. 3 is a screen shot of a webpage displaying a PXLgram in the PXLgram viewer, wherein one of the grid images has been clicked to enlarge for better viewing.

FIG. 3 is a screen shot of a webpage displaying a PXLgram 6 in the PXLgram viewer, wherein one of the grid images 9, depicting three bejeweled rings, has been clicked on to enlarge it for better viewing. Once a grid image 9 has been enlarged in this manner directional arrow icons 11 appear and allow the user to view grid images 9 located to the right or left of the current enlarged grid image 9. In the upper-left corner of the enlarged grid image 9 is a checked box 10 denoting that it has been marked as a favorite, as described herein. Below the grid image 9 the given name 13 of an image is shown and the share icon 7 and download icon 8, that are specific to this grid image 9, are displayed.

Figure 4:
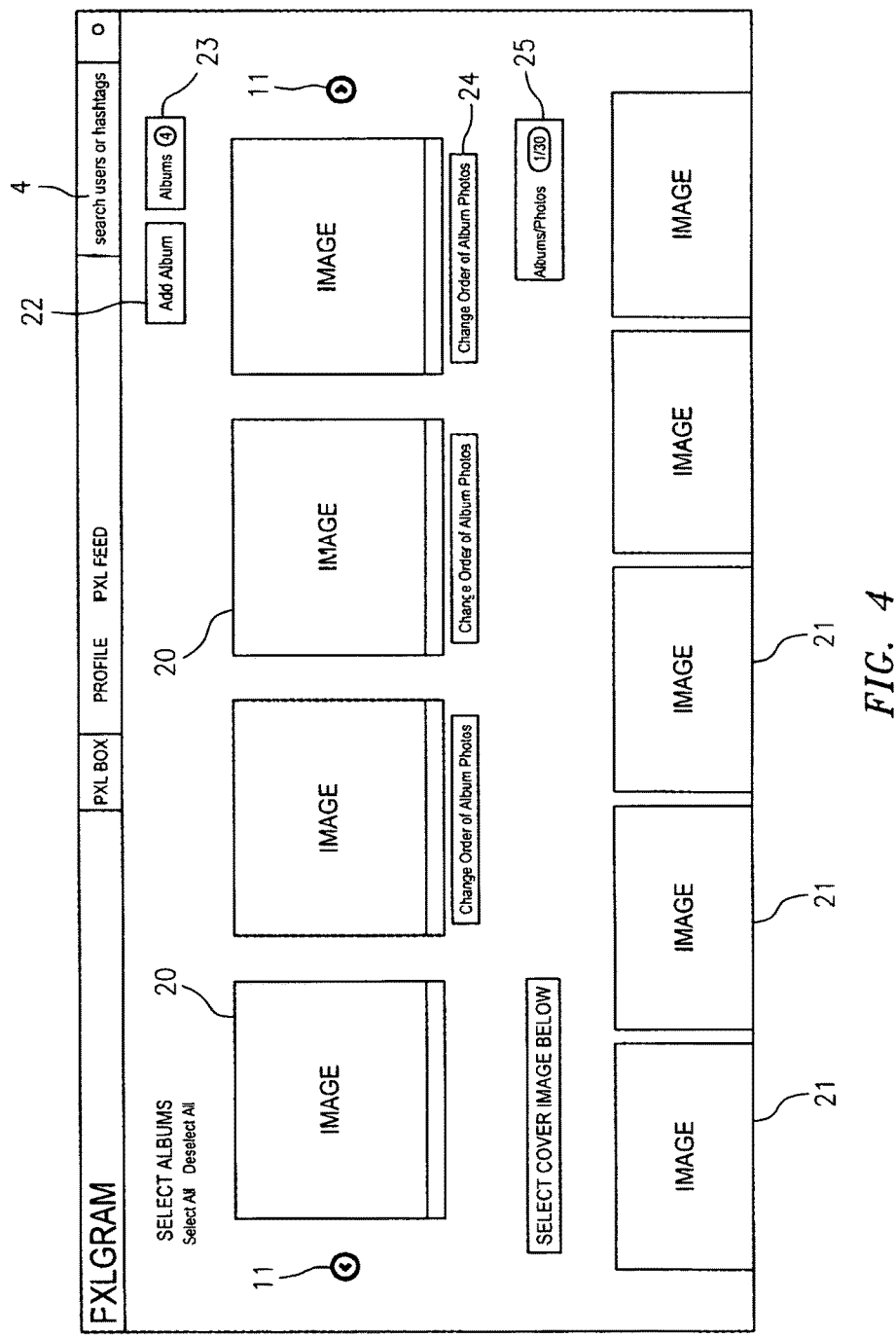
FIG. 4 is a screen shot of a webpage that is referred to as the PXL Box page and is part of the social website disclosed herein.

FIG. 4 is a screen shot of a webpage that is referred to as the PXL Box page and is part of the social website disclosed herein. On this page the user can manage his/her albums 20 and the images 21 stored therein. The user's albums 20 are displayed along the top of the page, and when one is selected, such as the most left album 20 in this screen shot, then the images 21 stored therein will be displayed below. These images 21 can be used as grid images and/or overlay images when creating PXLgrams, and one can be selected to be the cover image for the album 20 it is stored in. The user can create new albums 20 using the add album button 22, or can reorder the images stored in an album 20 using the "change order of album photos" button 24 and then dragging and dropping the images into the desired order.

There is also an album counter box 23 that displays the total number of albums 20 and an image counter box 25 that display the number of images 21 in a selected album 20, along with the number of that album 20. In the current screen shot, the first of four albums 20 is selected and the thirty images 21 therein are displayed below. Thus the album counter box 23 indicates four albums and the image counter box 25 indicates that there are thirty images 21 in the first album 20. The user can cycle through his/her albums 20 using directional arrow icons 11. There is also a search box 4 that allows the user to search for PXLgrams by user names or hashtags that have been associated with individual PXLgrams, a described herein.

Figure 5:
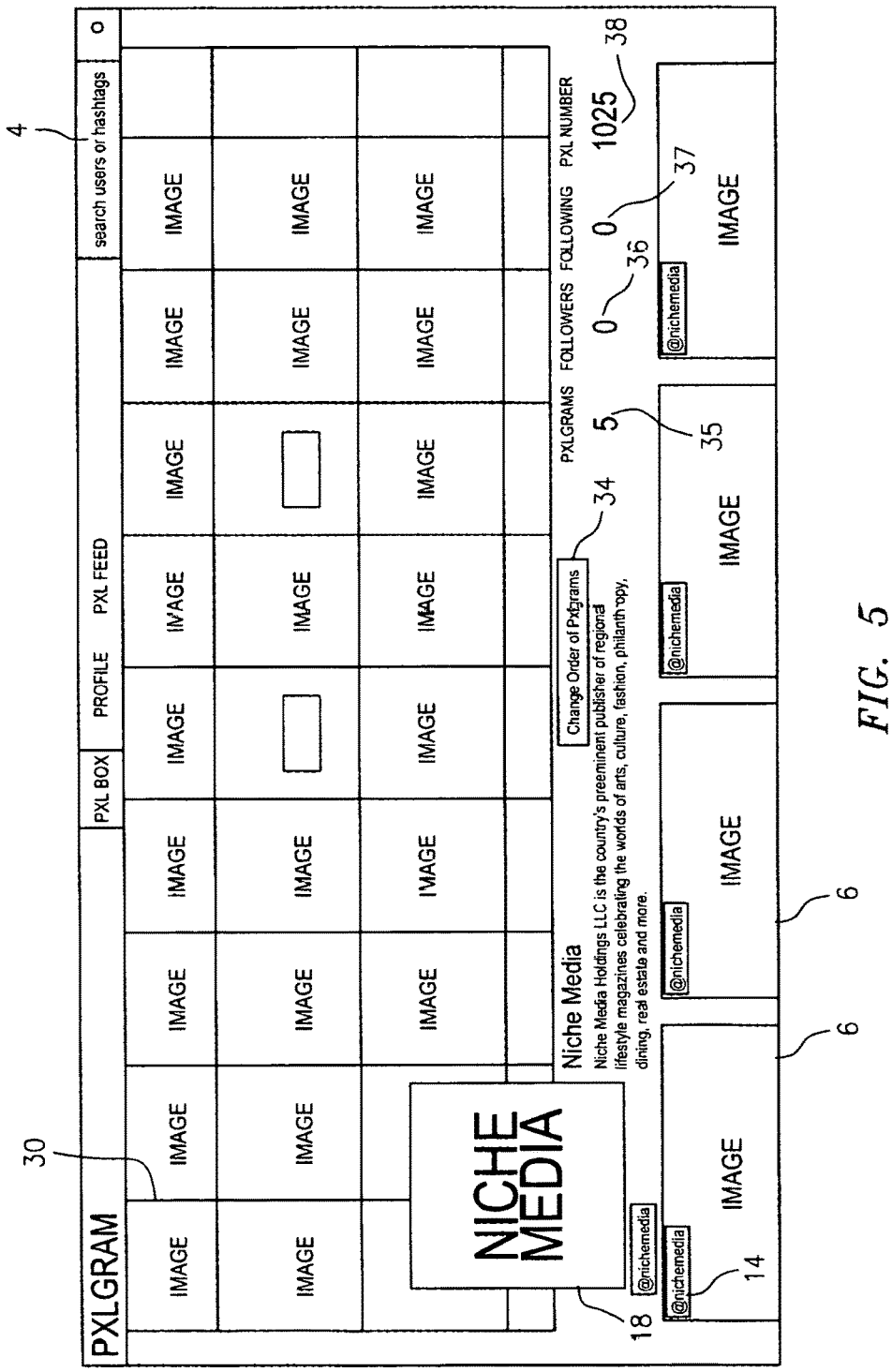
FIG. 5 is a screen shot of a webpage that is referred to as the Profile page and is part of the social website disclosed herein.

FIG. 5 is a screen shot of a webpage that is referred to as the Profile page and is part of the social website disclosed herein. Along the top of the page is the user's cover image 30, which acts like a banner and can include the name of the user and/or a brief description of the user, or any slogans, comments or philosophy that users choose to associate with themselves. There is also a profile image 18, which can be a picture of the user, a brand or logo, or an avatar.

On this page the user can manage his/her PXLgrams 6. Displayed on this page is the PXLgram counter 35, which indicates the total number of PXLgrams 6 the user has created or added via the PXL+ feature. Also displayed is the user's PXL number 38, which is assigned to the user when the account is created, the follower counter 36, which indicates the number of other users following this user, and the following counter 37, which indicates how many other users this user is following. The user can also reorder the PXLgrams 6 by clicking on the "change order of PXLgrams" button 34, similar to how a user can reorder images in an album on the PXL Box page. All of the PXLgrams 6 have the name of the user 14 displayed in the upper-left corner. There is a search box 4 in the upper-right corner, as has been previously described herein.

Figure 6:
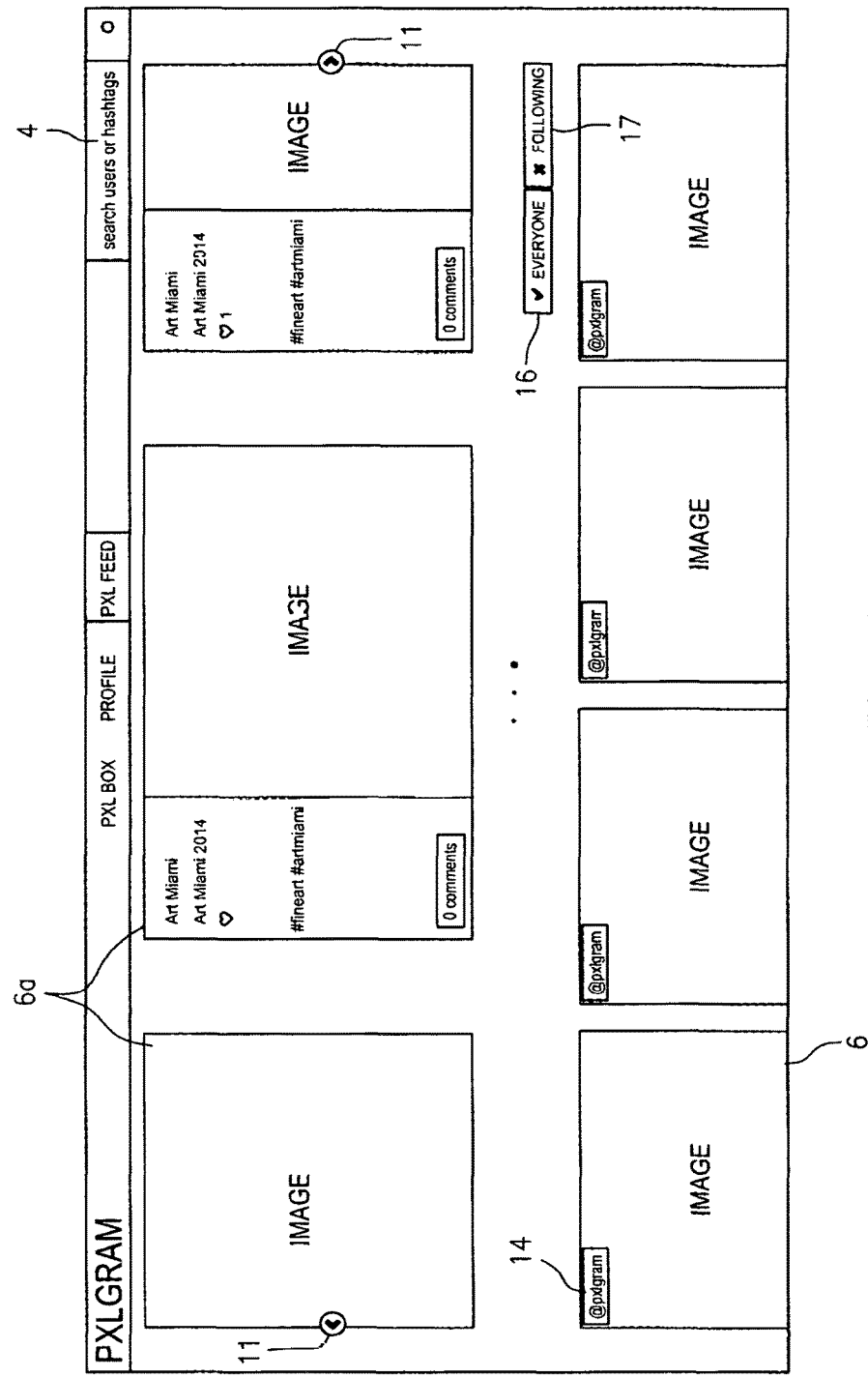
FIG. 6 is a screen shot of a webpage that is referred to as the PXL Feed page and is part of the social website disclosed herein.

FIG. 6 is a screen shot of a webpage that is referred to as the PXL Feed page and is part of the social website disclosed herein. On this page the user can view the PXL Feed, which is a series of PXLgrams 6a that scroll or move from right to left across the top of the page. The scrolling happens automatically, but the user can take manual control of this using the directional arrow icons 11, which are to the left and right of the PXL Feed. PXLgrams 6 of users are displayed along the bottom of the page, however, they can be limited to just those of users being followed by clicking on the following button 17, which acts as a filter. The present screen shot shows the "everyone" button 16 has been selected, as is denoted by the small check on the left side of the button. As usual, these PXLgrams 6 have the name of the creating user 14 displayed in the upper-left corner of the PXLgram 6. A search box 4 is located in the upper-right corner of the page, as described previously herein.

Figure 7:
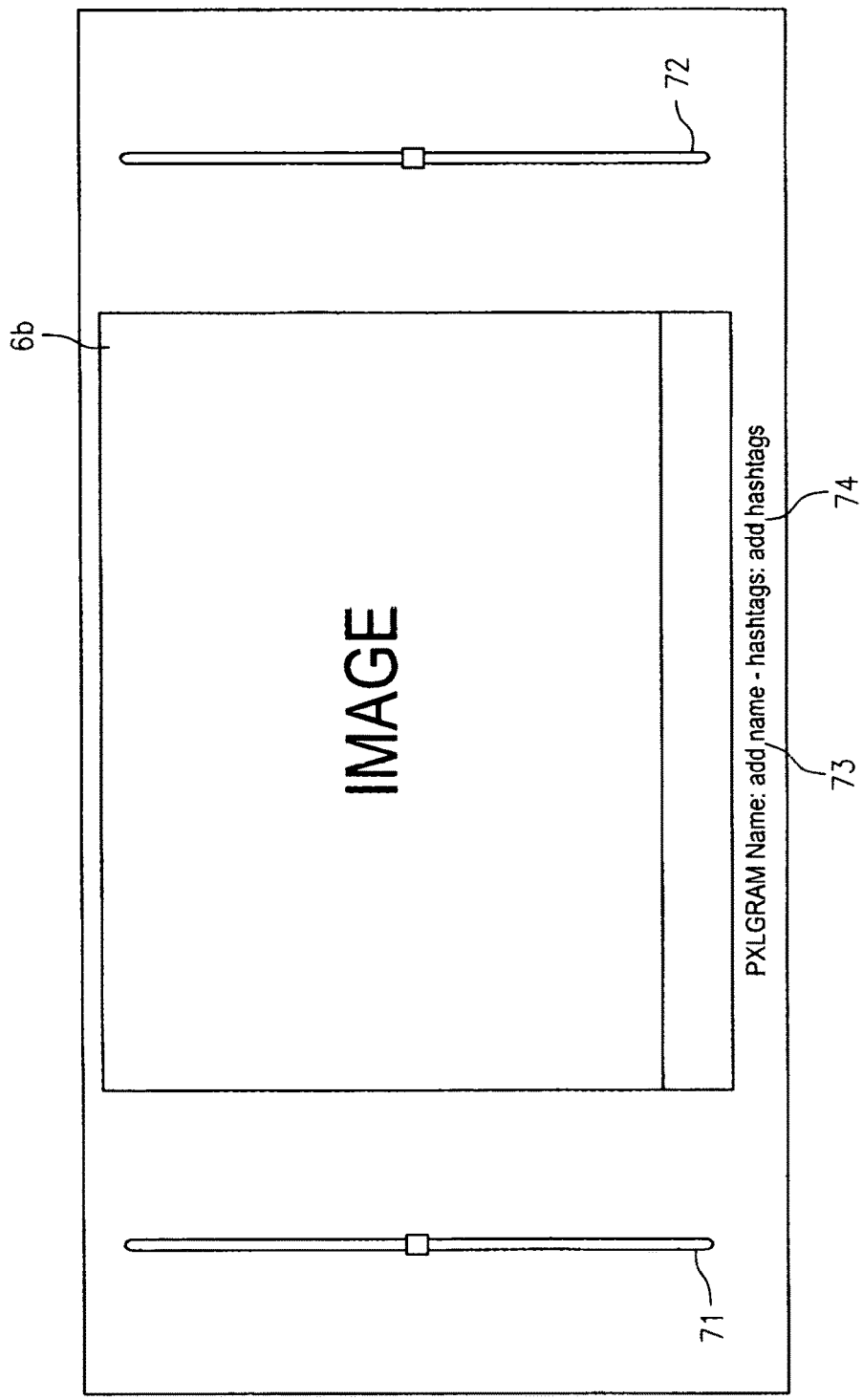
FIG. 7 is a screen shot of a webpage that is referred to as the PXLgram preview page and is part of the social website disclosed herein.

FIG. 7 is a screen shot of a webpage that is referred to as the PXLgram preview page and is part of the social website disclosed herein. On this page a user can quickly create a preview PXLgram 6b using randomly selected grid images, a described herein. On the left side of the page is the clarity or transparency slide control 71, which controls the degree of transparency for the overlay image, as described herein. On the right side of the page is the scale slide control 72, which controls the scale or number of tiles in the underlying grid (and therefore the number of grid images), as described herein. These slide controls alter the preview PXLgram 6b in real time so the user can quickly find the setting that will effectuate the desired look of the preview PXLgram 6b. Thereafter, the user can create a PXLgram on the PXL Box page using these settings with their selected grid images to quickly create a PXLgram having the desired appearance without the need for repeated trial and error.

The user can also choose a PXLgram name by clicking on the add name button 73 and associate hashtags using the add hashtags button 74, as described herein. This is similarly to when creating a PXLgram, wherein the user can also include a name for the PXLgram and associate hashtags with it for searching and filtering purposes.

Figure 8:
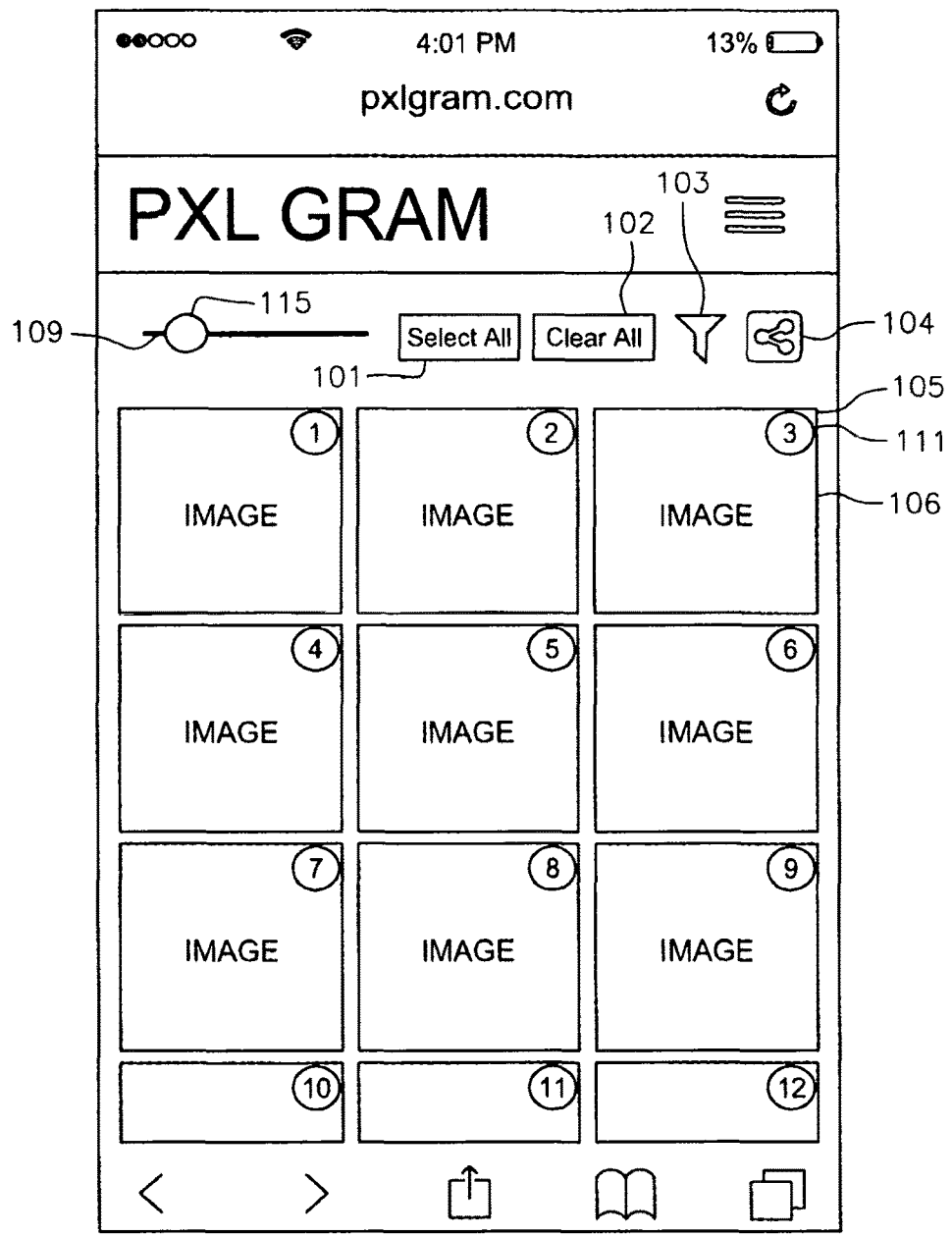
FIG. 8 is a screen shot from a mobile device showing a grid of grid images that comprise a PXLgram, wherein the slide control, "clear all" button and the "select all" button are displayed.

FIG. 8 is a screen shot of a PXLgram webpage being displayed on a mobile device, wherein the grid images 106 that comprise a selected PXLgram are being displayed in a grid 105 (here the grid is comprised of 3 columns and 3 whole rows and a partial $4^{th}$ row are displayed). Each grid image 106 has been numbered 111, and the number is super-imposed over the grid image 106. The grid images 106 are displayed scaled down to accommodate as many as possible on the screen/display of the mobile device, which is why the sizing slide control 109 is shown with the slide control button 115 almost all the way to the left; signifying that grid images 106 are reduced in size to almost the minimum allowed. Additionally, the "select all" button 101, the "clear all" button 102, the filter icon 103 and the "share" button 104 are displayed. Clicking on the "select all" button will cause all the grid images 106 to selected, whereas the "clear all" button will de-select any selected grid images 106. The "filter" icon 103, if clicked, will display only the selected grid images 106 (filtering out the grid images 106 that were not selected). The "share" button 104, if clicked, will give the user the options to email any selected grid images 106 to someone or to post any selected grid images 106 to a social media website, such as Facebook®, Twitter® and/or Instagram®. On this page, clicking on a grid image 106 will cause the images to be enlarged to the maximum size and cause the grid to be reordered to accommodate the larger size of the grid images 106 (as shown in FIG. 9).

Figure 9:
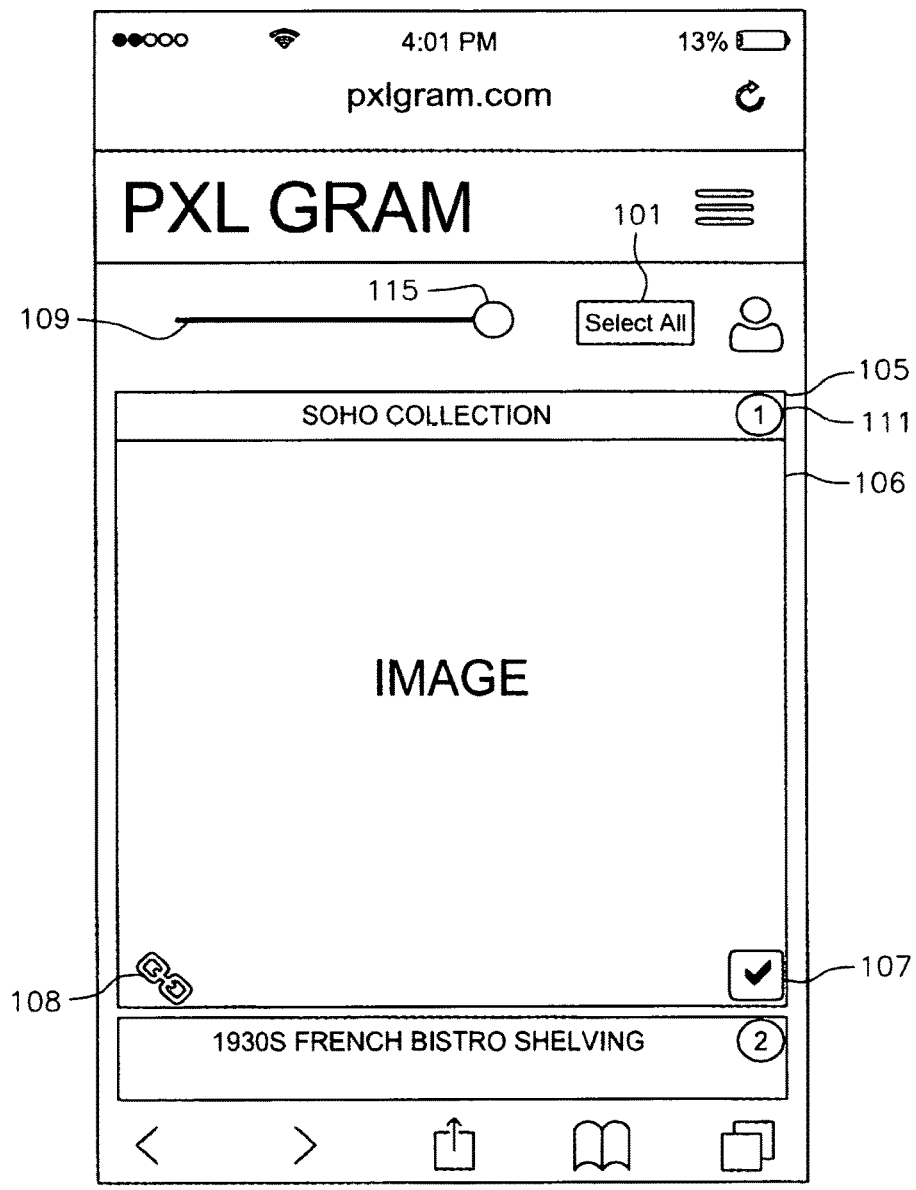
FIG. 9 is a screen shot from a mobile device showing the first image scaled up to max zoom (as indicated by the slide control), after being clicked on and wherein the "link" icon and the "check box" are displayed. The "check box" is not hi-lighted since the $1^{st}$ grid image has not yet been selected.

FIG. 9 is a screen shot of the PXLgram website displayed on a mobile device, wherein one grid image 106 that comprises a PXLgram has been clicked on, cause all the grid images 106 to be enlarged (hence why the slide scale button 115 is all the way to the right of the slide scale 109) and the grid 105 of grid images 106 has been reconfigured to have only one column to accommodate the larger size of the grid images 106. The grid images 106 also maintain the numbering 111, thus the grid image 106 that was labeled as number "1" is still labeled as number "1". Additionally, the "link" icon 108 and the "check box" icon 107 are displayed. Clicking or tapping on the "link" icon 108 will direct the user to a page selected by the user who originally associated the link to that image, such as a profile page or the website or the manufacturer/retailer, wherein the item depicted in the image can be purchased, for example. By clicking on the "check box" icon the user can select that grid image 106. The user can scroll through the grid 105 of images and select any grid images 106 of interest by clicking on the corresponding "check box" icons 107. Note that the "clear all" button 102 and the filter icon 103 (or the unfilter icon, which looks that same as the filter icon, but is shaded) is not shown, as currently none of the grid images 106 has been selected yet.

Figure 10:
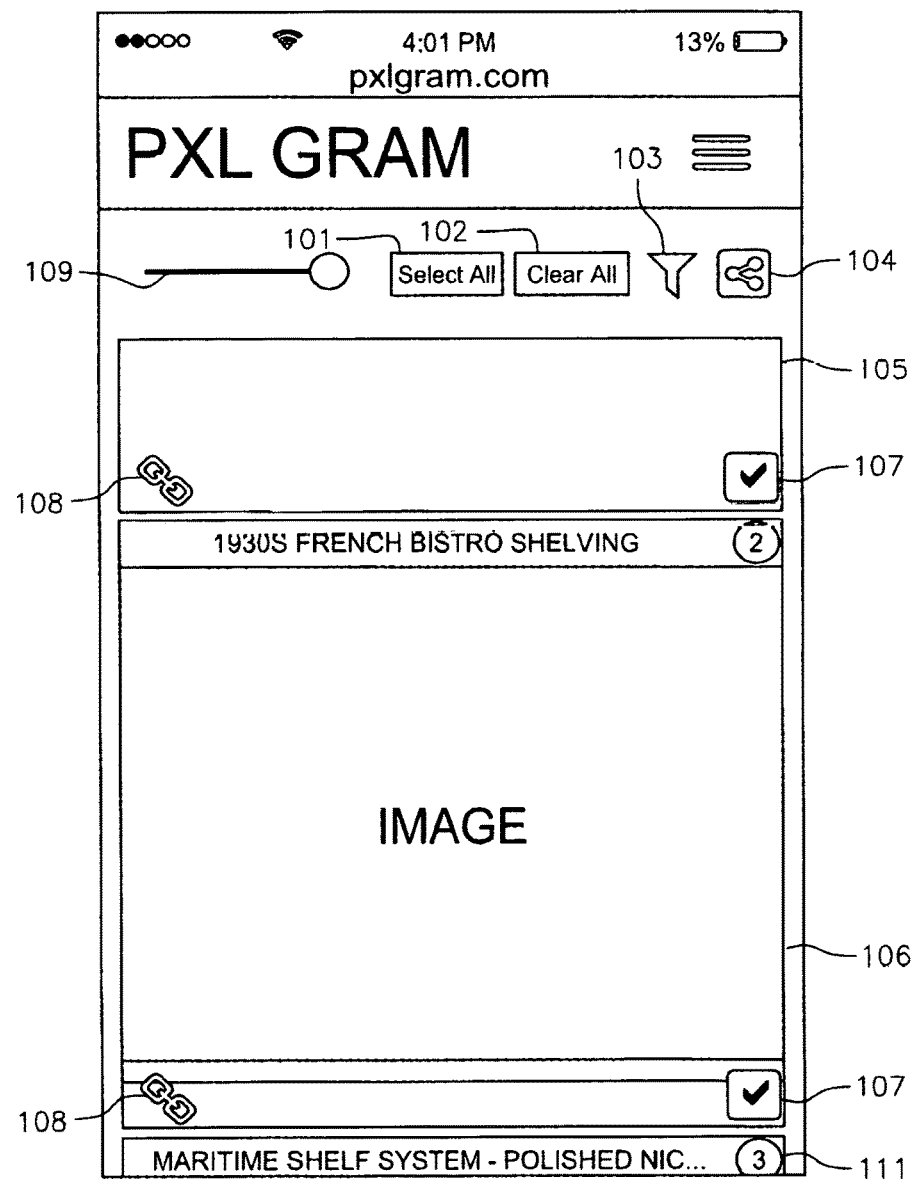
FIG. 10 is a screen shot from a mobile device showing grid images numbered 1 & 2, and wherein both of the "check boxes" are hi-lighted, indicating that both images have been selected. Also displayed are the "filter" icon and the share button.

FIG. 10 is a screen shot of the PXLgram website displayed on a mobile device, wherein several grid images 106 that comprise a PXLgram have been selected by clicking on the "check box" icons 107. Thus, the "filter" icon 103 and the "clear all" button 102 are now displayed in addition to many of the other buttons and icons already described herein. Clicking on the "clear all" button 102 will de-select all the selected grid images 106. Clicking on the filter icon 103 will cause only the selected grid images 106 to be displayed (see FIG. 11).

Figure 11:
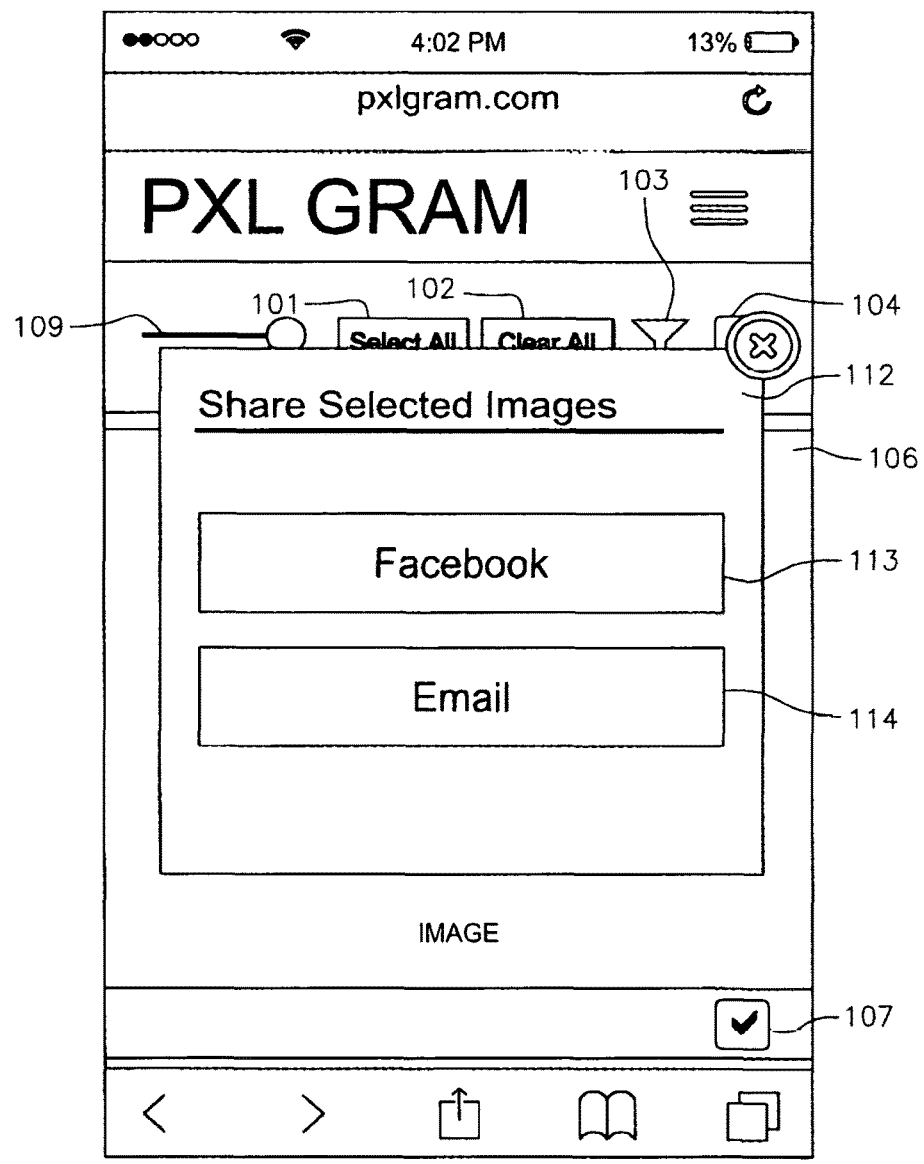
FIG. 11 is a screen shot from a mobile device showing grid image numbered 2 after the "share" button has been clicked so that the two buttons are displayed that allow the user to email or post a link to another person or a social media website, respectively.

FIG. 11 is a screen shot of the PXLgram website displayed on a mobile device, wherein several grid images 106 that comprise a PXLgram have been selected, the user has clicked the "filter" icon 103 so that only the selected grid images 106 are displayed, and the user has clicked the "share" button 104, which has caused a text box 112 to pop up. In the text box 112 are a "Facebook®" button 113 and an "email" button 114. Additionally, other buttons associated with other social media websites, such as Twitter® and Instagram®, for example, can appear here as well. Clicking on the "Facebook®" button 113 will post a link (that appears as the selected grid images 106) to the users Facebook® page. Clicking the "email" button will allow the user to email a link (again, that appears as the selected grid images 106) to someone. It is important to note that the user, after sending an email with a link and/or posting a link, can easily return to the full list of grid images 106 by simply clicking the "clear all" button. Thus, allowing the user to select other grid images 106 (in a multitude of combinations) and quickly emailing or posting a links to them as well in a near seamless cycle, if desired.

Figure 12:
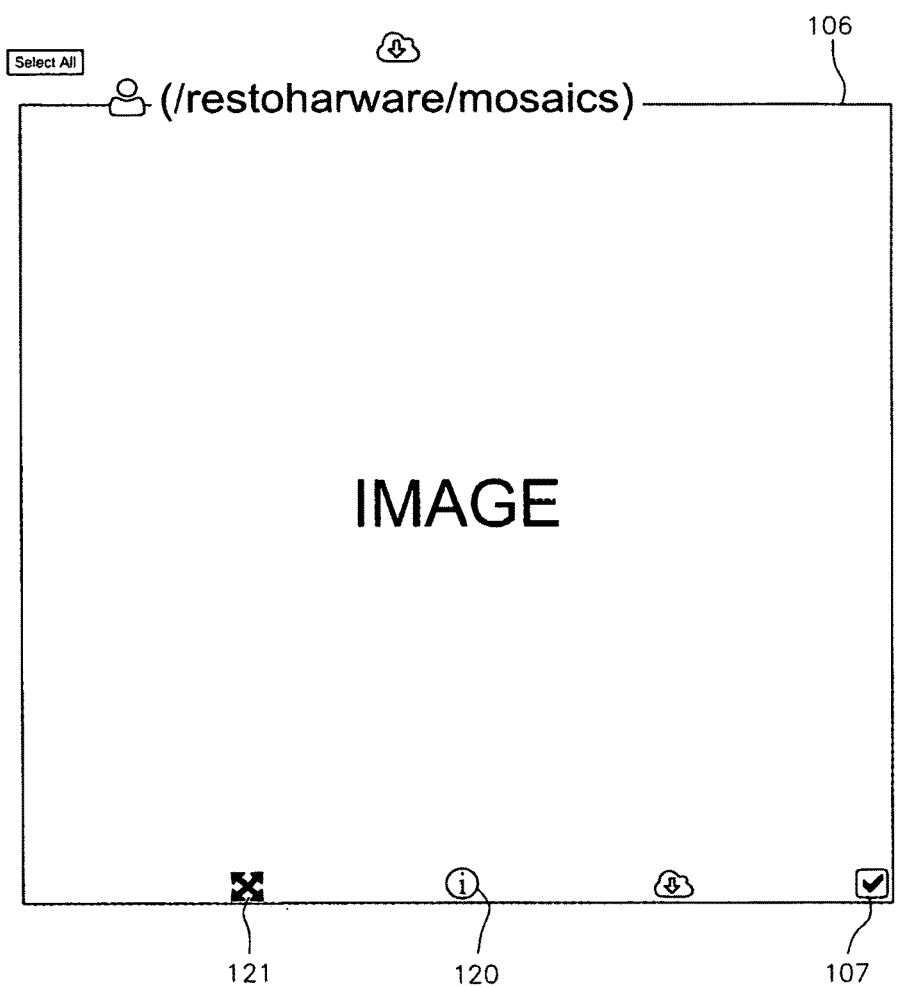
FIG. 12 is a printing of the PXLgram website, wherein the "information" icon and the "original image" icon are displayed.

FIG. 12 is a printing of the PXLgram website where a grid image 106 is displayed. Also shown superimposed on the grid image 106 are the information icon 120 and the original image icon 121.

Figure 13:
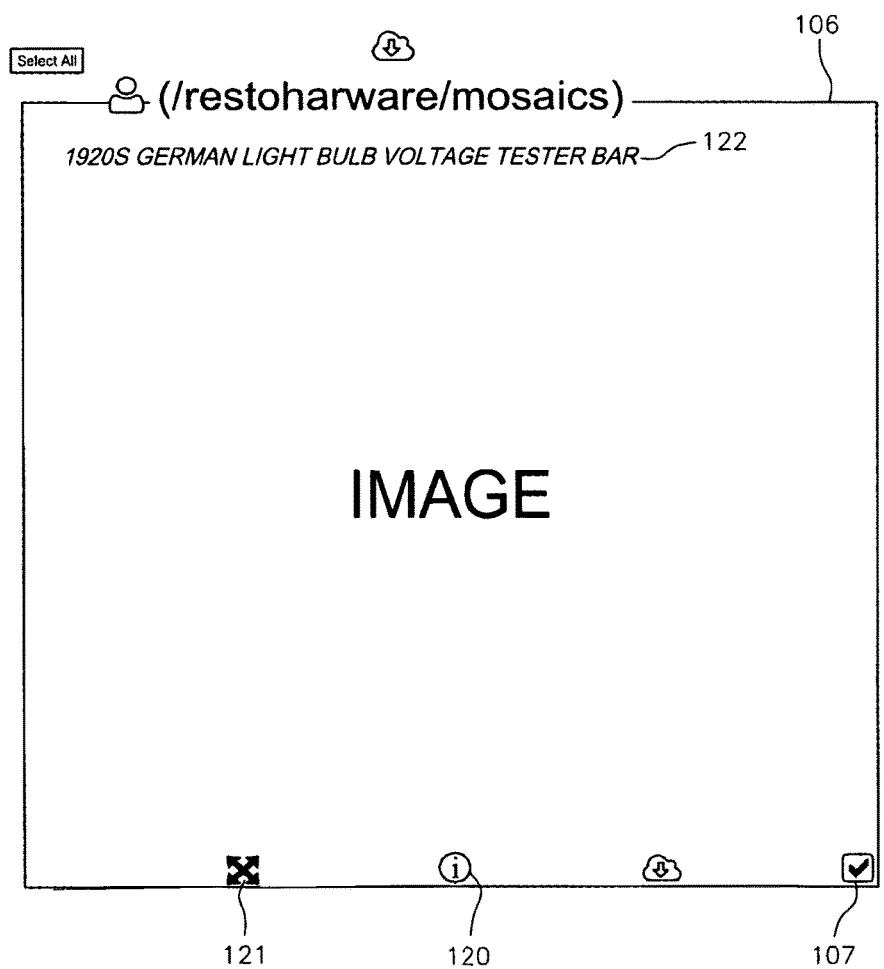
FIG. 13 is a printing of the PXLgram website, wherein the "information" icon has been clicked, and thereby, caused the information associated with the grid image to be superimposed over the grid image.

FIG. 13 is a printing of the PXLgram website where a grid image 106 is displayed. This is the same as FIG. 12 except that the information icon 120 has been clicked causing the associated information 122 to be displayed superimposed over the grid image 106. Note that FIGS. 12 and 13 are printings of the website, as opposed to screen shots of a computer display or mobile device, and therefore some of the icons or buttons shown on other figures herein are not shown or appear differently.

Figure 14:
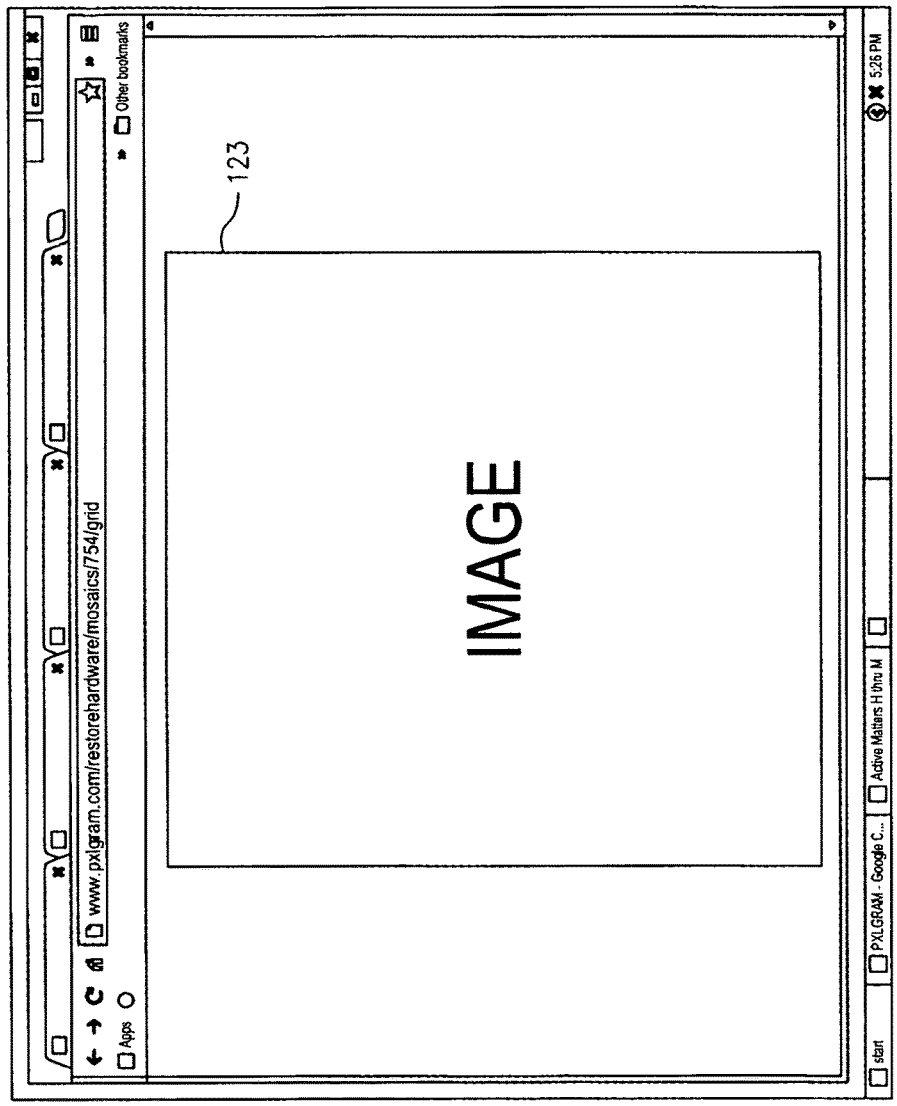
FIG. 14 is a screen shot, wherein the "original image" icon has been clicked by the user, causing the grid image to be displayed in its original format prior to any scaling or cropping. The original image is superimposed over the grid image, thereby obscuring it from view.

FIG. 14 is a screen shot of the PXLgram website wherein the original image icon 121 has been clicked causing the original image 123 to be displayed on top of the grid image 106 so that it can no longer be seen.

We claim:

1. A method of communicating, comprising the steps of:
   a. selecting one or more images from a image library;
   b. arranging the images selected in step a in a grid having tiles arranged in rows and columns, thereby creating a first filtered set of images;
   c. sending an electronic communication to one or more individuals that contains a link to a webpage, wherein the webpage displays the first filtered set of images created in step b.;
   d. clicking on the link contained in the communication allows an individual to view the webpage displaying the first filtered set of images selected in step b.;
   e. selecting one or more images from the first filtered set of images and/or from other images contained in the image library and arranging them in the grid created in step b, thereby creating a second filtered set of images; and
   f. sending an electronic communication to one or more individuals that contains a link to a webpage, wherein the webpage displays the second filtered set of images created in step d.;
   wherein, steps d, e and f can be repeated indefinitely, and with every repetition creating a new filtered set of images that can be sent to any number of recipients, who can create and send more filtered sets of images.

2. The method of claim 1, further comprising wherein an individual viewing the webpage displaying the set of images can also view all the images from which the set of images was selected from, and wherein the individual can then select images to create a new set of images to be sent to other individuals.

3. The method of claim 1, wherein communication containing the link to the webpage can also contain written statements, text and icons.

4. The method of claim 1, wherein the number of images in a set of images that are displayed on the webpage are only limited by the technology employed by the provider of the service.

5. The method of claim 1, wherein the electronic communication is selected from the group consisting of email and social media.

6. The method of claim 5, wherein the social media is selected from the group consisting of tweets, instant messages, direct messages and Facebook postings.

7. A method of communicating, comprising the steps of:
   a. selecting one or more images from an image library,
   b. arranging the images selected in step a in a grid having tiles arranged in rows and columns thereby creating a first filtered image library;
   c. sending an electronic communication to one or more individuals that contains a link to a webpage, wherein the webpage displays the first filtered image library created in step b.;
   d. clicking on the link contained in the communication allows an individual to view the webpage displaying the first filtered image library in step b.;
   e. selecting one or more images from the first filtered image library and/or from the image library, wherein the filter has been deactivated and arranging them in the grid created in step b, thereby creating a second filtered image library; and
   f. sending an electronic communication to one or more individuals that contains a link to a webpage, wherein the webpage displays the second filtered image library created in step e.;
   wherein, steps d, e and f can be repeated indefinitely, and with every repetition creating a new customized filtered image library that can be sent to any number of recipients, who can create and send more filtered image libraries.

8. The method of claim 7, further comprising wherein an individual viewing the webpage displaying the filtered image library can deactivate the filter to view all the images in the image library, and wherein the individual can then select images to create a new filtered image library to be sent to other individuals.

9. The method of claim 7, wherein communication containing the link to the webpage can also contain written statements, text, and icons.

10. The method of claim 7, wherein the number of images in a set of images that are displayed on the webpage are only limited by the technology employed by the provider of the service.

11. The method of claim 7, wherein the electronic communication is selected from the group consisting of email and social media.

12. The method of claim 11, wherein the social media is selected from the group consisting of tweets, instant messages, direct messages and Facebook postings.

* * * * *